(12) United States Patent
Pulpatta et al.

(10) Patent No.: US 7,493,376 B1
(45) Date of Patent: Feb. 17, 2009

(54) METHOD AND APPARATUS FOR MONITORING RESPONSES OF CONFIGURATION COMMANDS USING A MIB-BASED APPROACH

(75) Inventors: Rajesh Pulpatta, Palakkad (IN); Subramanian K. Ramachandran, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1148 days.

(21) Appl. No.: 10/330,902

(22) Filed: Dec. 24, 2002

(51) Int. Cl.
*G06F 15/13* (2006.01)

(52) U.S. Cl. .................. 709/220; 709/223; 709/235; 707/3; 707/103 R

(58) Field of Classification Search .............. 709/220, 709/223, 235; 707/3, 103 R
See application file for complete search history.

(56) References Cited

U.S. PATENT DOCUMENTS

| | | | |
|---|---|---|---|
| 6,292,835 B1 * | 9/2001 | Huang et al. ............. | 709/235 |
| 6,349,306 B1 * | 2/2002 | Malik et al. ............. | 707/103 R |
| 6,714,972 B1 * | 3/2004 | Lee et al. ................ | 709/220 |
| 6,751,608 B1 * | 6/2004 | Cohen et al. ............ | 707/3 |
| 6,981,036 B1 * | 12/2005 | Hamada ................. | 709/223 |

OTHER PUBLICATIONS

Joe Habraken, "Practical Cisco Routers," 1999, pp. 100-102, 124-126, 132-134 and 143, no date.
Cisco Systems, Inc., "Internetworking Technologies Handbook, Third Edition," 2001, pp. 829-840, no date.
Joe Habraken, "Practical Cisco Routers," 1999, pp. 100-102, 124-126, 132-134 and 143.
Cisco Systems, Inc., "Internetworking Technologies Handbook, Third Edition," 2001, pp. 829-840.

* cited by examiner

*Primary Examiner*—Jinsong Hu
(74) *Attorney, Agent, or Firm*—Hickman Palermo Truong & Becker

(57) ABSTRACT

A method is disclosed for monitoring responses of configuration commands using MIB-based and event-based approaches. According to one embodiment, a network element receives a configuration that comprises one or more configuration commands. A command response table, which comprises a plurality of command response entries, is created and stored. The command response table is defined by a MIB. The network element stores information, which describes errors that occurred while executing the plurality of commands in the configuration file, into the command response entries of the command response table. Management applications can query the MIB to obtain details about errors that occurred during execution of the configuration.

31 Claims, 12 Drawing Sheets

| Command Response Table 151 |
|---|
| Command Response Entry 211A |
| Command Response Entry 211B |
| . . . |
| Command Response Entry 211N |

FIG. 2A

| Command Response Entry 211A |||
|---|---|---|
| Command Response Index Field 213 | Command Line Index Field 214 | Command Response Value Field 215 |

FIG. 2B

| Event Message 143 |||
|---|---|---|
| Command Response Index Field 213 | Command Line Index Field 214 | Command Response Value Field 215 |

FIG. 2C

METHOD AND APPARATUS FOR MONITORING RESPONSES OF CONFIGURATION COMMANDS USING A MIB-BASED APPROACH

FIELD OF THE INVENTION

The present invention generally relates to network management. The invention relates more specifically to monitoring responses of configuration commands, executed on a network element, using a MIB based approach.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In packet-switched networks, routers are used to route data packets between various network elements. Routers need to be configured to provide various tasks. For example, a router may be configured to route streaming video on a particular interface from 8:00 am to 5:00 pm and then may be configured to provide a different capability on the same interface during the rest of the day. Furthermore, a router may be configured to process packets in different ways, or to provide different capabilities from one day to the next.

One approach to configuring routers is to establish a communication session, such as a telnet session, from a configuration management application residing on a network management station to a particular router across a network, and transmit commands, such as command line interface commands (CLI commands), to the router. However, this approach has disadvantages. One disadvantage is the performance cost. The configuration management application has to send a command, receive a response, and determine the nature of the response for each command during a configuration change, and perform rollbacks, if necessary, in response to configuration errors. Therefore, the performance of the configuration management application suffers as the number of commands increases.

A second approach to configuring routers is to download configuration files, which typically comprise a large number of CLI commands, to a router using Trivial File Transfer Protocol (TFTP) using the command line interface (referred to hereinafter as the TFTP using CLI approach). A third approach is for a configuration management application to transfer a configuration file by setting values in Management Information Base (MIB) objects of the router using Simple Network Management Protocol (SNMP) messages (referred to hereinafter as the SNMP approach). In the third approach, once the values for the MIB objects are set, configuration files are downloaded using TFTP. However, these approaches also have numerous disadvantages.

One disadvantage of the TFTP using CLI approach is the inability to determine, in the event of a configuration failure, which command in the configuration file failed. Consequently, the configuration management application does not have enough information to take appropriate action, such as performing rollbacks or determining whether to copy a particular configuration file, which resulted in errors, to other routers.

A disadvantage of the SNMP approach is that, while it is possible to determine the status of the configuration file transfer to the device, no means is provided to determine the results of executing the configuration commands in the device. Thus, while the TFTP approach and SNMP approach provide performance improvement, configuration management applications cannot provide functions such as "rollback configuration changes," because the applications cannot determine the results of configuration changes.

Based on the foregoing, there is a clear need for determining the nature of a configuration failure in a network device that uses SNMP based TFTP or CLI based TFTP configuration transfers, while minimizing performance costs.

There is a particular need for an approach that enables a configuration management application to determine whether errors occurred during a configuration change when the changes are made using SNMP and MIB instrumentation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram that illustrates a command response table of FIG. 1A;

FIG. 2B is a block diagram that illustrates a command response entry of FIG. 2A;

FIG. 2C is a block diagram that illustrates an event message of FIG. 1B;

DETAILED DESCRIPTION OF THE PREFERRED EMBODIMENT

A method and apparatus for monitoring responses of configuration commands using a MIB based approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
    2.1 Structures for Storing and Providing Information 2.2 Implementing A Command Response Table Using MIB Extensions
2.3 MIB Extensions Used In The Trap/Notification Approach
3.0 Method of Monitoring Responses of Configuration Commands
3.1 Monitoring Responses Of Configuration Commands Using The Configuration Response Table Approach
3.2 Monitoring responses of configuration commands using the Trap/notification approach
3.3 Monitoring responses of configuration commands using the Publish-Subscribe Approach
4.0 Conclusion
5.0 Implementation Mechanisms-Hardware Overview
6.0 Extensions and Alternatives

1.0 GENERAL OVERVIEW

The needs identified in the foregoing Background, and other needs and objects that will become apparent for the following description, are achieved in the present invention, which comprises, in one aspect, a method for monitoring responses of configuration commands using a MIB based approach. According to one embodiment, a network device receives a configuration file that comprises one or more commands for configuring the network device. The network device creates and stores a command response table, which comprises a plurality of command response entries. The command response table is defined by a MIB on the network device. The network device stores information, which describes errors that occurred while executing the plurality of commands in the configuration file, in one or more command response entries of the command response table.

According to another embodiment, a network device is configured to publish one or more event messages that describe errors. The network device receives a configuration file that comprises one or more commands for configuring the network device. The network device publishes event messages describing errors, which occurred while executing the commands, to subscribers of the errors.

In other aspects, the invention encompasses a computer apparatus and a computer-readable medium configured to carry out the foregoing steps.

2.0 STRUCTURAL AND FUNCTIONAL OVERVIEW

Figure 1A:
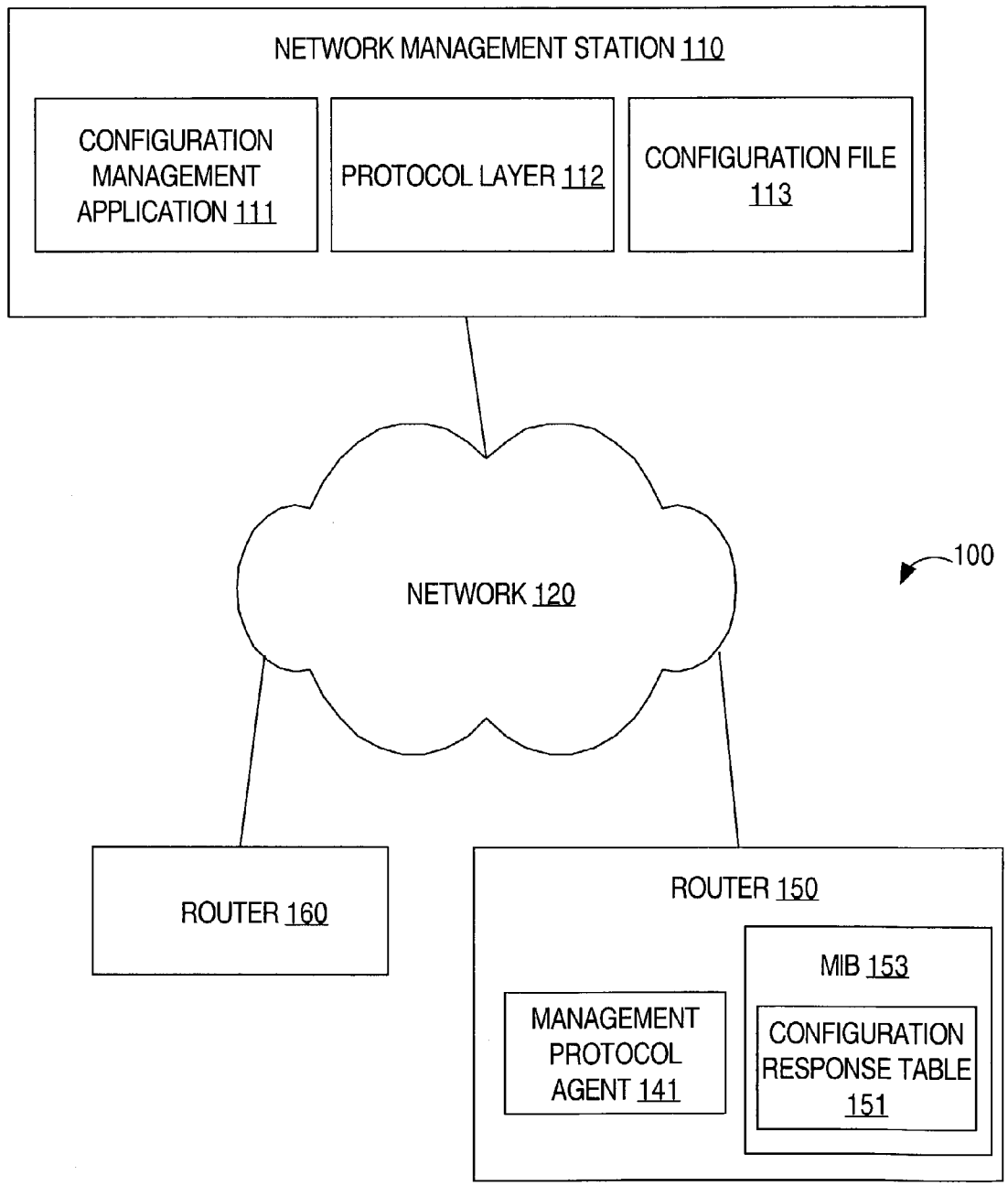
FIGS. 1A and 1B are block diagrams that illustrate overviews of example systems for monitoring responses of configuration commands using MIB based approaches, according to embodiments.
Figure 1B:
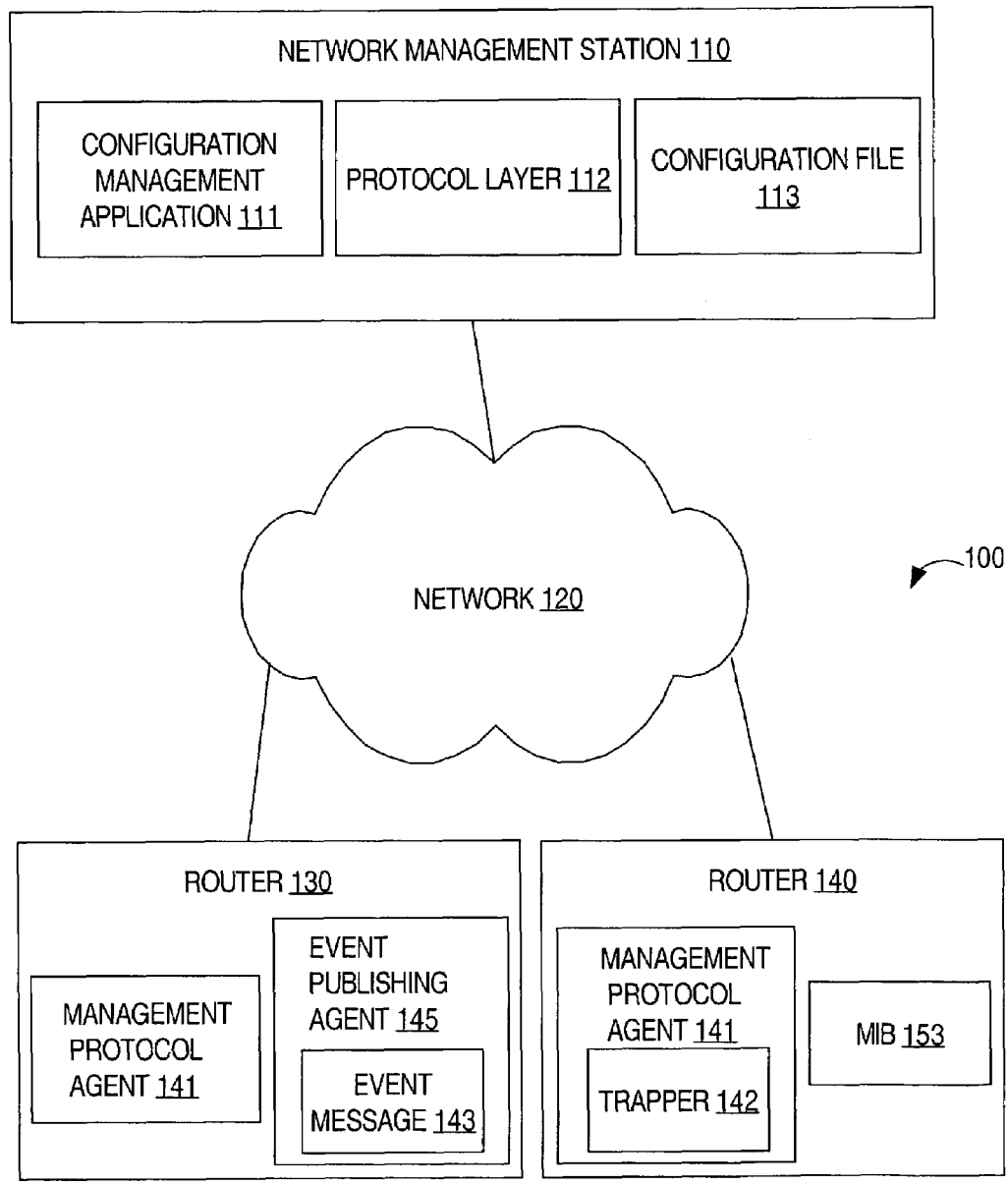

FIGS. 1A and 1B are block diagrams that illustrate overviews of example systems for monitoring responses of configuration commands using MIB based approaches, according to embodiments. Referring to FIG. 1A, System 100 comprises a Network Management Station 110, a Network 120, a Router 160, and a Router 150. The Network Management Station 110, the Router 160 and the Router 150 are communicatively coupled to the Network 120. Network 120 typically is an enterprise network, but may be any local area network, wide area network, or one or more internetworks. Router 160 is not required. Referring to FIG. 1B, Network Management Station 110 comprises a Configuration Management Application 111, a Protocol Layer 112, a Configuration File 113 and Network 120, as in FIG. 1A. Network Management Station 110 is communicatively coupled to Network 120 and Routers 130, 140 are communicatively coupled to Network 120.

Although FIGS. 1A and 1B depict routers, any other network device that can perform the functions described herein may be used in an embodiment. Thus, any use of the term "router" in this description is intended broadly to encompass any other such network device. All network links depicted in FIGS. 1A and 1B may be landline links, wireless links, or any other form of link that can communicate network information.

Network Management Station 110 is configured to run a Configuration Management Application 111 and a Protocol Layer 112. Configuration Management Application 111 allows a network administrator to configure a router, such as Routers 130, 140, 150, 160, by entering one or more commands into a Configuration File 113 and by copying or downloading the Configuration File 113 to the router. Further, Configuration Management Application 111 may automatically initiate configuration of one or more routers as part of performing higher-level program functions. Examples of commercially available configuration management applications include NetConfig and Configuration Archive, which form part of Resource Manager Essentials in CiscoWorks 2000, from Cisco Systems, Inc.

When Configuration File 113 is downloaded to a router, such as Router 130, 140, 150, 160, the one or more commands in the Configuration File 113 are executed on the router to configure the router. The execution of these commands may result in the generation of errors on the router. In this description, information pertaining to the errors is termed "error information."

In the embodiment of FIG. 1A, Router 150 comprises a Management Protocol Agent 141 and a Management Information Base (MIB) 153. Management Protocol Agent 141 performs functions at Router 150 according to a management protocol, such as SNMP. For example, Configuration Management Application 111 may issue one or more SNMP requests over network 120 to Router 150. The requests are received at Management Protocol Agent 141 and executed. Requests may specify to Get or Set the value of a specified object or variable in MIB 153. The MIB 153 includes a Configuration Response Table 151, the structure of which is described further below in relation to FIG. 2A.

According to one embodiment, error information is stored in a plurality of command response entries associated with the Configuration Response Table 151. As described further below, Configuration Management Application 111 may download Configuration File 113 to Router 150. Agent 141 receives the Configuration File 113 and executes its commands. If executing a command results in an error, Agent 141 stores error information in the command response entries of Configuration Response Table 151. Thereafter, a network administrator may enter a query on a Network Management Station 110 to determine the status of the configuration process on Router 150. In response, Agent 141 retrieves and returns error information from the Configuration Response Table 151 to the Configuration Management Application 111. Hereinafter, this approach shall be referred to as the "configuration response table approach."

Referring to FIG. 1B, Router 130 has an Event Publishing Agent 145 that is configured to publish event messages, such as Event Message 143. When an error occurs in executing a configuration that has been downloaded to Router 130, Management Protocol Agent 141 causes Event Publishing Agent 145 to publish an event that comprises error information in a specified format. In this alternative, the Configuration Management Application 111 is configured to subscribe to the event messages. Accordingly, Configuration Management Application 111 can perform actions in response to receiving an event message that signals a configuration error. In this description, this approach is termed the "publish-subscribe approach." Event Publishing Agent 145 may be compatible with a commercial event bus system, such as those available from The Information Bus Co. (TIBCO).

Router 140 comprises a Management Protocol Agent 141 and a Trapper 142. According to one embodiment, the Protocol Layer 112 of Network Management Station 110 supports Simple Network Management Protocol (SNMP), the Agent 141 is an SNMP agent, and the Trapper 142 is an SNMP trap generator. As described further below, when an error occurs in executing a configuration that has been downloaded to Router 140, Agent 141 is configured to cause Trapper 142 to throw an SNMP trap message having a specified structure. In this description, this approach is termed the "trap/notification approach."

2.1 Structures for Storing and Providing Information

FIG. 2A is a block diagram that illustrates a command response table, according to one embodiment.

In this embodiment, Command Response Table 151 comprises a plurality of Command Response Entries 211A, 211B, 211N. For example, error information that pertains to the first error encountered while executing the commands associated with the Command File 113 is stored in Command Response Entry 211A. Error information that pertains to the second error encountered while executing the commands associated with the Command File 113 is stored in Command Response Entry 211B and so on. There may be any number of Command Response Entries in Command Response Table 151.

FIG. 2B is a block diagram that illustrates a command response entry of FIG. 2A, according to one embodiment. Each Command Response Entry comprises one or more fields in which a router or agent may store error information. For example, Command Response Entry 211A comprises a Command Response Index Field 213, Command Line Index Field 214, and Command Response Value Field 215.

According to one embodiment, the Command Response Index Field 213 uniquely identifies a particular configuration operation. For example, in configuring routers on a network, a network administrator may download more than one configuration file to a router at different times. At the time of each download operation, Management Protocol Agent 141 creates a unique identifier for the operation. The unique identifier is stored in Command Response Index Field 213 for each Command Response Entry associated with an error in the then-current operation.

For example, copying a first version Configuration File 113 to Router 150 constitutes a first configuration operation. A first unique identifier is created and associated with the first configuration operation. If execution of the one or more commands associated with the Configuration File 113 results in a particular error in the first configuration operation, then the first unique identifier is stored in Command Response Index Field 213 of a first Command Response Entry 211A. Downloading a second version of Configuration File 113 to Router 150, or downloading a different configuration, constitutes a second configuration operation. A second unique identifier is created and used for any entries in Command Response Table 151 that pertain to errors in the second configuration operation. In this way, in responding to queries by Network Management Station 110, Agent 141 can discriminate among entries that pertain to different configuration operations.

According to one embodiment, Command Line Index Field 214 stores a value that uniquely identifies a location in a configuration file of a particular error. For example, Command Line Index Field 214 may store a row number or line number within Configuration File 113 of a particular command that resulted in an error.

According to one embodiment, the Command Response Value Field 215 stores a value that describes a particular error.

For example, error description information that resulted from the execution of a particular command, an error code that resulted from the execution of the particular command, or a column number in Configuration File 113 where a particular error occurred, may be stored in the Command Response Value Field 215. Command Response Value Field 215 also may store a string that is returned by Agent 141 or other elements of Router 150 when errors occur when executing the configuration commands.

FIG. 2C is a block diagram that illustrates an event message of FIG. 1B, according to one embodiment. In general, an event message comprises one or more fields in which Event Publishing Agent 145 and Agent 141 store error information for use by a subscriber application. For example, in one embodiment an event message comprises Command Response Index Field 213, Command Line Index Field 214, and Command Response Value Field 215. Command Response Index Field 213, Command Line Index Field 214, and Command Response Value Field 215 may store the same information described above with respect to FIG. 2B.

2.2 Implementing a Command Response Table Using MIB Extensions

According to one embodiment, a command response table is implemented in a MIB on a router. For example, the Command Response Table 151 may be defined by MIB extensions, as depicted in Tables 1-6, to a MIB 153 on Router 150. According to one embodiment, MIB 153 is a Cisco CONFIG-COPY-MIB and the MIB extension of Table 1 extend the Cisco CONFIG-COPY-MIB.

TABLE 1

Command Response Table MIB Extension

CcCopyCommandResponseTable OBJECT-TYPE
    SYNTAX SEQUENCE OF CcCopyCommandResponseEntry
    MAX-ACCESS not-accessible
    STATUS current
    DESCRIPTION
        "A table of config-copy command lines/responses."
    ::= {ccCopy 2}

According to one embodiment, the command response entries, command response index field, command line index field, and command response value field associated with a command response table are defined by a MIB 153 on a Router 150. For example, the Command Response Entries 211A, 211B, 211N may be defined by the command response entry MIB extensions shown in Table 2 and Table 3. The Command Response Index Field 213 may be defined by the command response index MIB extension shown in Table 4. The Command Line Index Field 214 may be defined by a command line index MIB extension as shown in Table 5. The Command Response Value Field 215 may be defined by a command response value MIB extension as shown in Table 6.

TABLE 2

Command Response Entry MIB Extension

CcCopyCommandResponseEntry OBJECT-TYPE
    SYNTAX CcCopyEntry
    MAX-ACCESS not-accessible
    STATUS current
    DESCRIPTION
        "A config-copy command response.
        A network management station wishing to create an entry should
        first generate a random serial number to be used
        as the index to the ccCopyEntry sparse table. After successfully
        executing the commands in the command file on the device, the TABLE 2-continued Command Response Entry MIB Extension agent will use this index to store the execution results in the command response table"
INDEX { CcCopyCommandResponseIndex }
::= { CcCopyCommandResponseTable 1 }

TABLE 3

Command Response Entry MIB Extension

CcCopyCommandResponseEntry ::=
    SEQUENCE {
        CcCopyCommandResponseIndex    Unsigned32,
        CcCopyCommandLineIndex    Unsigned32,
        CcCopyCommandResponseValue    DisplayString,
    }

TABLE 4

Command Response Index MIB Extension

CcCopyCommandResponseIndex OBJECT-TYPE
    SYNTAX    Unsigned32 (1..2147483647)
    MAX-ACCESS    not-accessible
    STATUS current
    DESCRIPTION
        "Object which specifies a unique entry in the
        ccCopyTable. Same as ccCopyIndex."
    ::= { CcCopyCommandResponseEntry 1 }

TABLE 5

Command Line Index MIB Extension

CcCopyCommandLineIndex OBJECT-TYPE
    SYNTAX    Unsigned32 (1..2147483647)
    MAX-ACCESS    not-accessible
    STATUS current
    DESCRIPTION
        "Object which will have the line number information as in the
        configuration file (ccCopyFileName)"
    ::= { CcCopyCommandResponseEntry 2 }

TABLE 6

Command Response Value MIB Extension

CcCopyCommandResponseValue OBJECT-TYPE
    SYNTAX    DisplayString (SIZE (1..100))
    MAX-ACCESS    not-accessible
    STATUS current
    DESCRIPTION
        "The response of each command executed on the device."
    ::= { CcCopyCommandResponseEntry 3 }

2.3 MIB Extensions Used in the Trap/Notification Approach

According to one embodiment, a specified trap message is defined for use in reporting configuration errors from a router to a configuration management application. MIBs may have one or more notification type objects that define trap messages. Therefore, a notification type of the specified trap message may be defined using a MIB extension.

An example of a notification type MIB extension that defines a specified trap message for use in reporting configuration errors is shown in Table 7. The MIB extension of Table 7 may be implemented as a notification type object in MIB 153 on Router 140 of FIG. 1B. According to one embodiment, MIB 153 is a Cisco CONFIG-COPY-MIB and the MIB extension of Table 7 extends the Cisco CONFIG-COPY-MIB.

TABLE 7

Notification Type MIB Extension

CcCopyCommandResponses NOTIFICATION-TYPE
    OBJECTS {
        CcCopyCommandResponseIndex,
        CcCopyCommandLineIndex,
        CcCopyCommandResponseValue,
    }
    STATUS current
    DESCRIPTION
        "A collection of objects providing the ability to relay the
response commands."
    ::= { ccCopyMIBTraps 2 }

According to one embodiment, the notification type MIB extension comprises a command response index, a command line index, and a command response value, which may store the same information as described above with respect to FIG. 2B and FIG. 2C. If Agent 141 detects an error when executing a particular command of the Configuration File 113, Agent 141 creates a trap message based on the notification type of Table 7. A unique identifier associated with the then-current configuration operation is stored in the command response index field of the notification. A location of the error is stored in the command line index of the notification. A description of the error is stored in the command response message field of the notification. The notification is then thrown as a trap message in the conventional manner used for other trap messages.

Figure 2D:
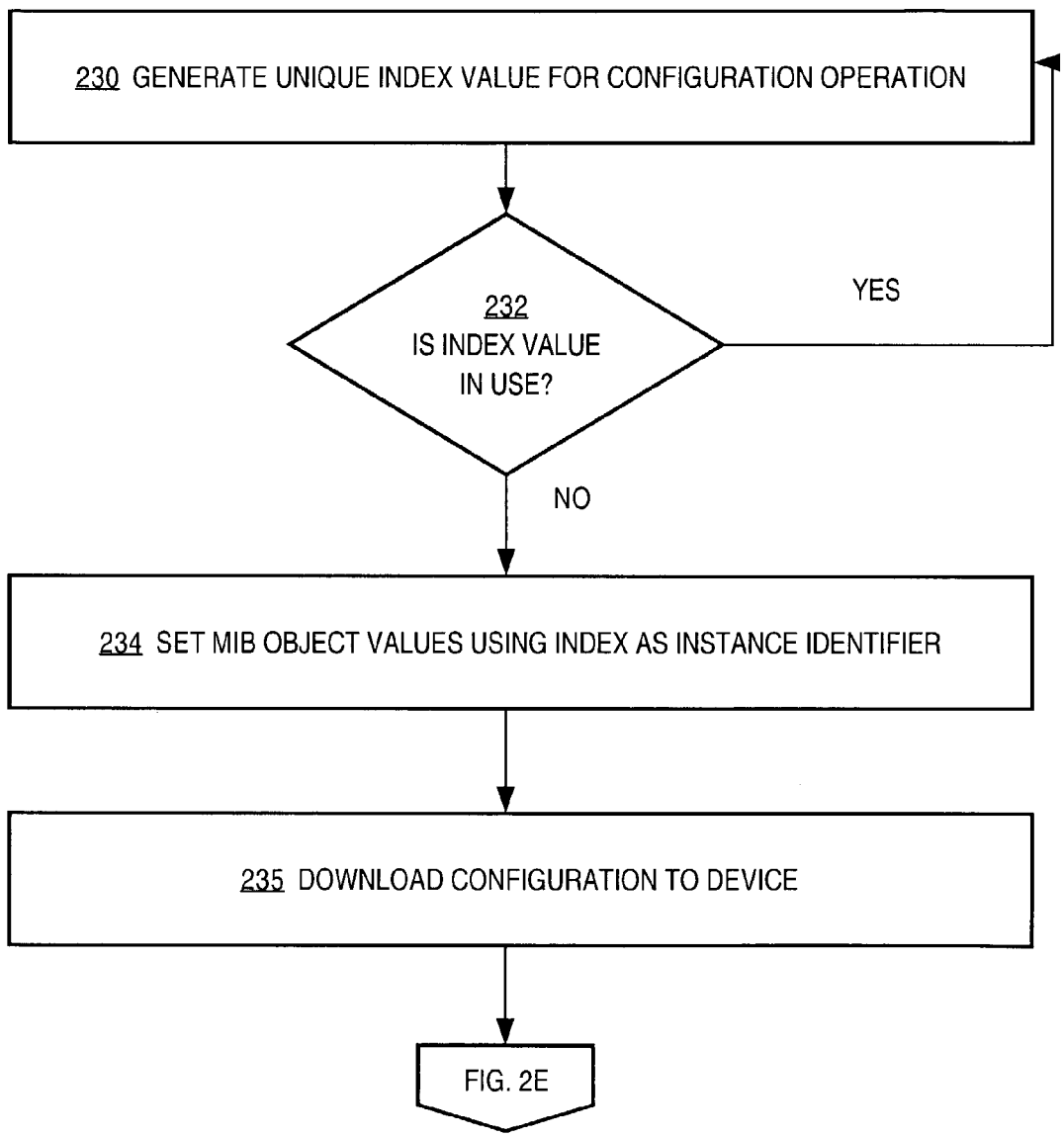
FIG. 2D and FIG. 2E are flow diagrams that illustrate a high level overview for preparing to monitor responses of configuration commands.
Figure 2E:
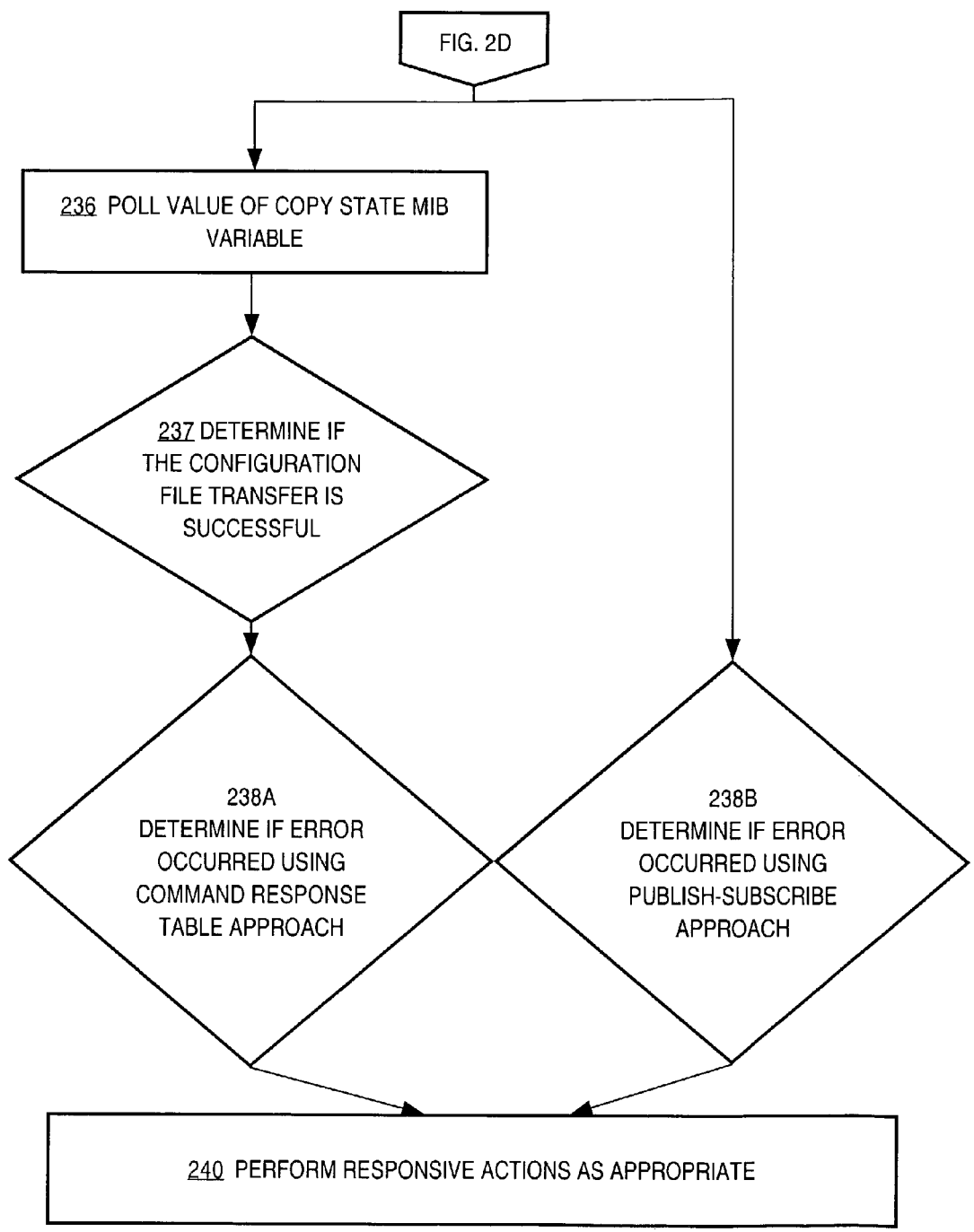

3.0 METHOD OF MONITORING RESPONSES OF CONFIGURATION COMMANDS 3.1 Monitoring Responses of Configuration Commands Using the Configuration Response Table Approach FIG. 2D and FIG. 2E are flow diagrams that illustrate a high level overview for preparing to monitor responses of configuration commands.

Referring first to FIG. 2D, in step 230, a unique identifier or index value is generated for a configuration operation. In step 232, a test is performed to determine if the unique identifier is already being used for a previously copied configuration file. If the unique identifier is already in use, then control passes back to block 230 in which another unique identifier is generated. Blocks 230 and 232 repeat until the process determines a unique identifier that is not being used.

In step 234, one or more MIB objects or variables are instantiated in a MIB, using the unique identifier value as an instance identifier. For example, instances of the ccCopyProtocol, ccCopySourceFileType, ccCopyDestFileType, ccCopyServerAddress, and ccCopyFileName MIB objects, etc., are set using the unique identifier as an instance identifier. In block 235, a configuration is downloaded to a target network device. For example, Configuration File 113 is downloaded to a router, such as Router 140 or Router 150.

Referring now to FIG. 2E, in block 236, a value of the copy state MIB variable is polled. The polling operation provides a polling application with an initial view about whether the configuration download completed. In block 237, the polling application determines whether the configuration download was successful. In block 238A, 238B, alternative approaches are pursued for determining whether a configuration error occurred. In block 238A, a MIB-based approach using a command response table is performed. Alternatively, in block 238B, a publish-subscribe approach is used to determine whether a configuration error occurred. According to one embodiment, the trap/notification approach is an alternative to the publish-subscribe approach. Each approach is described further below. In block 240, responsive actions are performed, as appropriate.

Figure 3A:
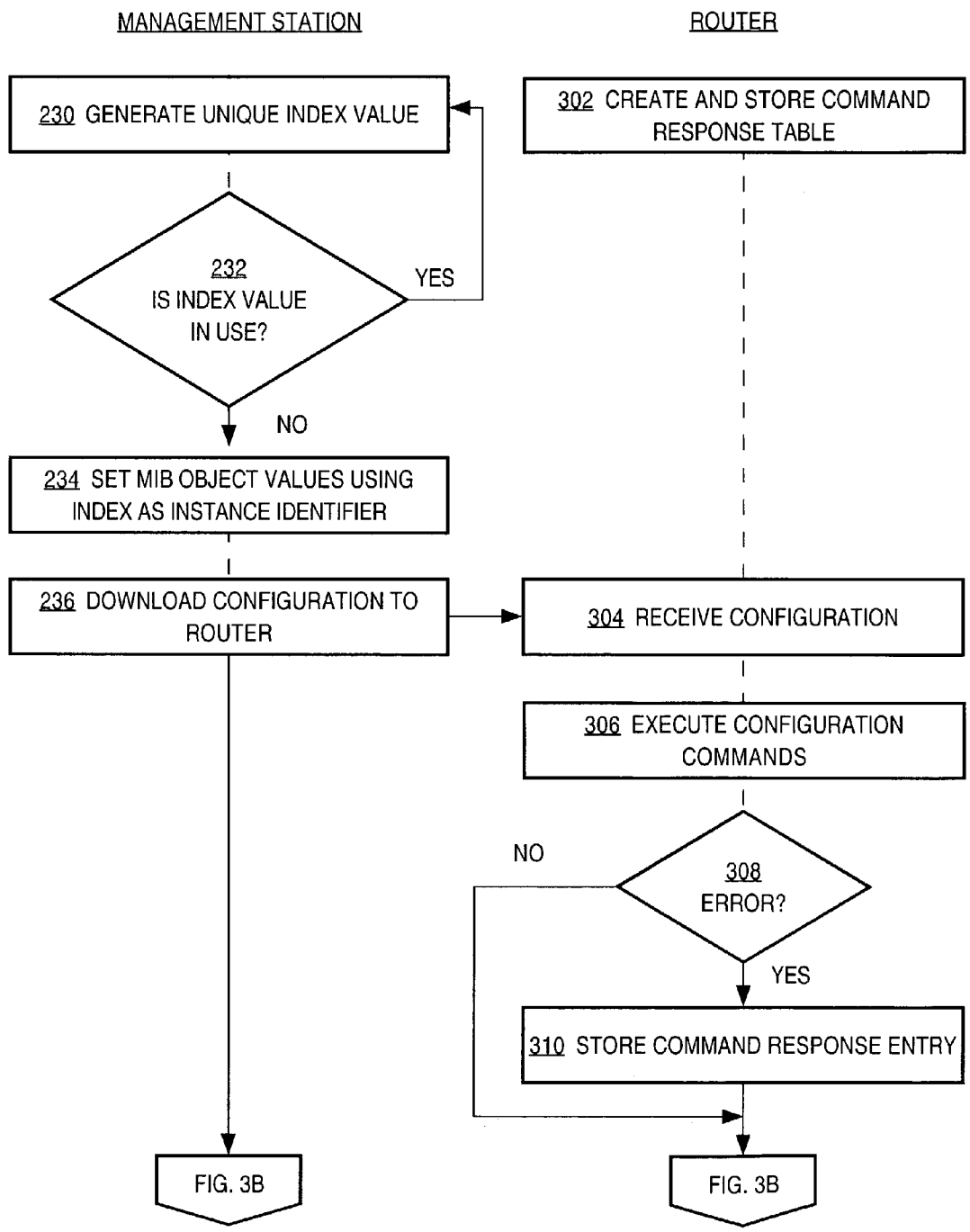
FIG. 3A and FIG. 3B are flow diagrams that illustrate a high level overview of one embodiment of a method for monitoring responses of configuration commands using a MIB based approach.
Figure 3B:
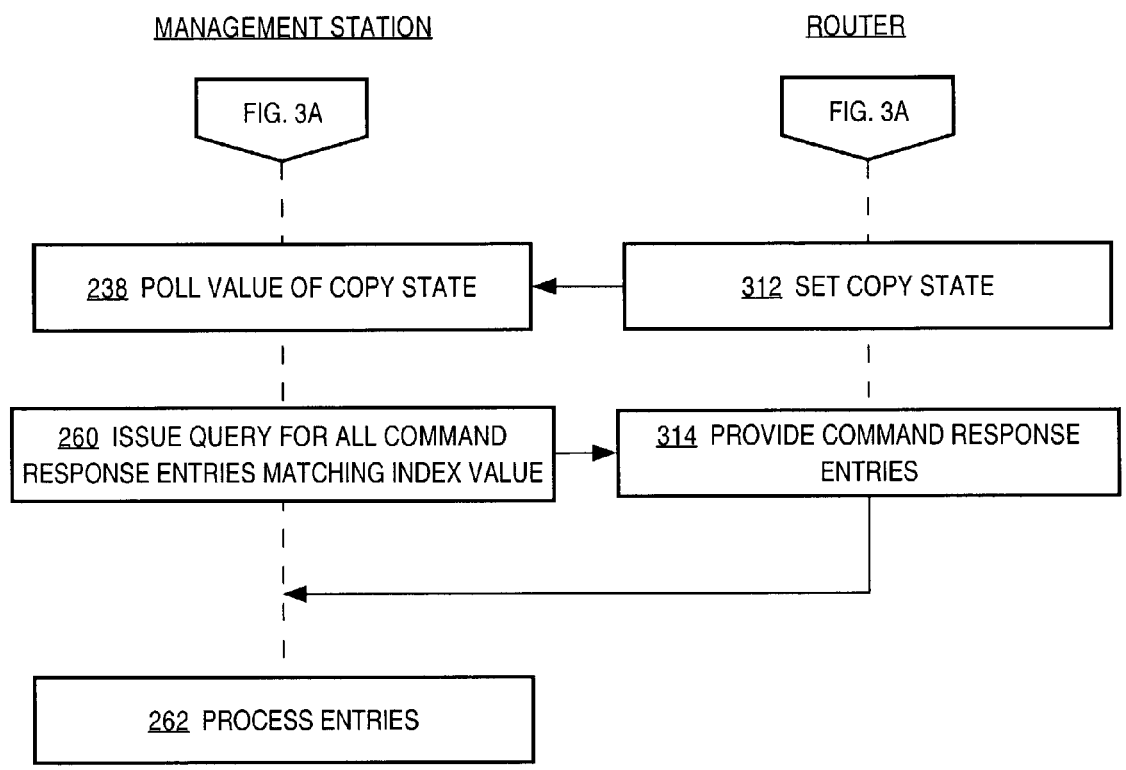

FIG. 3A and FIG. 3B are flow diagrams that illustrate a high level overview of one embodiment of a method for monitoring responses of configuration commands using a MIB-based command response table approach.

In step 230, a unique identifier or index value is generated for a configuration operation. For example, Configuration Management Application 111 generates a unique identifier associated with a first operation for downloading the Configuration File 113 to router 130. In step 232, a test is performed to determine if the unique identifier is already being used for a previously copied configuration file. If the unique identifier is already in use, then control passes back to block 230 in which another unique identifier is generated. Blocks 230 and 232 repeat until the process determines a unique identifier that is not being used.

In step 234, one or more MIB objects or variables are instantiated in a MIB, using the unique identifier value as an instance identifier. For example, instances of the ccCopyProtocol, ccCopySourceFileType, ccCopyDestFileType, ccCopyServerAddress, and ccCopyFileName MIB objects, etc., are set using the unique identifier as an instance identifier.

In block 236, a configuration is downloaded to a target network device. For example, Configuration File 113 is downloaded to a router, such as Router 140 or Router 150. A network administrator interacting with a Configuration Management Application 111 on a Network Management Station 110 copies a Configuration File 113 comprising one or more commands to Router 150. According to one embodiment, TFTP or the Remote Copy Protocol (RCP) may be used to copy a Configuration File 113 to a router.

At a point in time before step 236, a command response table is created and stored at the router, as indicated by step 302. For example, the Configuration Manager 152 creates and stores a Command Response Table 151. Alternatively, Command Response Table 151 is created and stored by router 150 automatically upon boot-up and initialization. Command Response Table 151 comprises a plurality of command response entries, such as Command Response Entry 211A, 211B, 211N. The Command Response Table 151 forms part of MIB 153 on Router 150. According to one embodiment, the MIB extensions of Tables 1-6 are used to define the Command Response Table 151.

At step 304, the router receives the configuration file that was downloaded at step 236.

At step 306, the router executes the configuration commands. For example, the Router 150 executes the one or more commands in the Configuration File 113. If an error occurs in executing a particular configuration command, as tested in step 308, then in step 310, information associated with the error is stored into the command response table, for example, using Command Response Entry 211A. The unique identifier of the then-current configuration operation is stored into Command Response Index Field 213. A value identifying a location in the Configuration File 113 of the error is stored into Command Line Index Field 214. According to one embodiment, the value of the location of the error may be a row number of the particular command. A string describing the error is stored into the Command Response Value Field 215.

Steps 306, 308, and 310 may iterate for each command in the configuration that is downloaded to the router. When all configuration commands are processed, in block 312, a copy state MIB variable is set to a value that indicates whether the configuration was successful.

To determine whether the configuration download is complete and successful, in step 238, the value of the copy state MIB variable is polled. For example, Configuration Management Application 111 polls the value of the ccCopyState variable in MIB 153 to determine if the Configuration File 113 has been successfully copied to the Router 150.

However, the ccCopyState variable does not provide error information. Therefore, in step 260, the management application issues a query to retrieve all entries in the command response table that have an index value matching the unique index value that was generated in step 230 for the then-current configuration operation. Step 260 may be performed immediately after step 238, or at any future time. According to one embodiment, the unique identifier may be used to query a MIB. For example, the unique identifier of the then-current configuration operation may be used to query the Configuration Response Table 151 to obtain error information associated with the operation.

In response, as shown in step 314, the router provides matching command response entries from the command response table. In this way, the management application receives information specifying all errors that occurred in executing the configuration.

In step 262, the application may process the received matching command response entries. For example, management application 111 may perform one or more responsive actions, as appropriate, based on information received in response to the query of step 260. For example, the application may need to roll back all configuration changes, download a different configuration, generate an error message, etc.

Figure 4A:
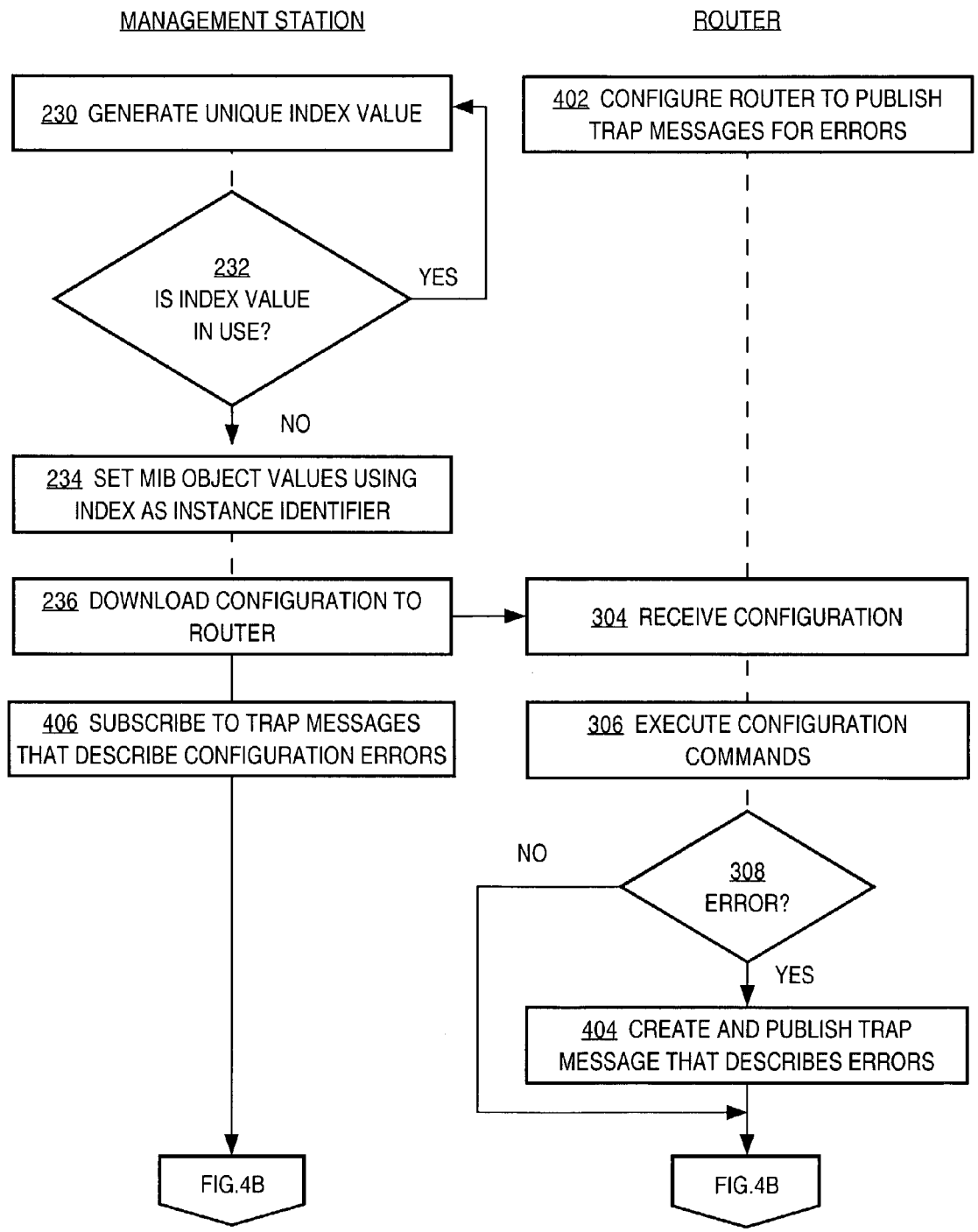
FIG. 4A and FIG. 4B are flow diagrams that illustrate a high level overview of another embodiment of a method for monitoring responses of configuration commands using a trap/notification approach.
Figure 4B:
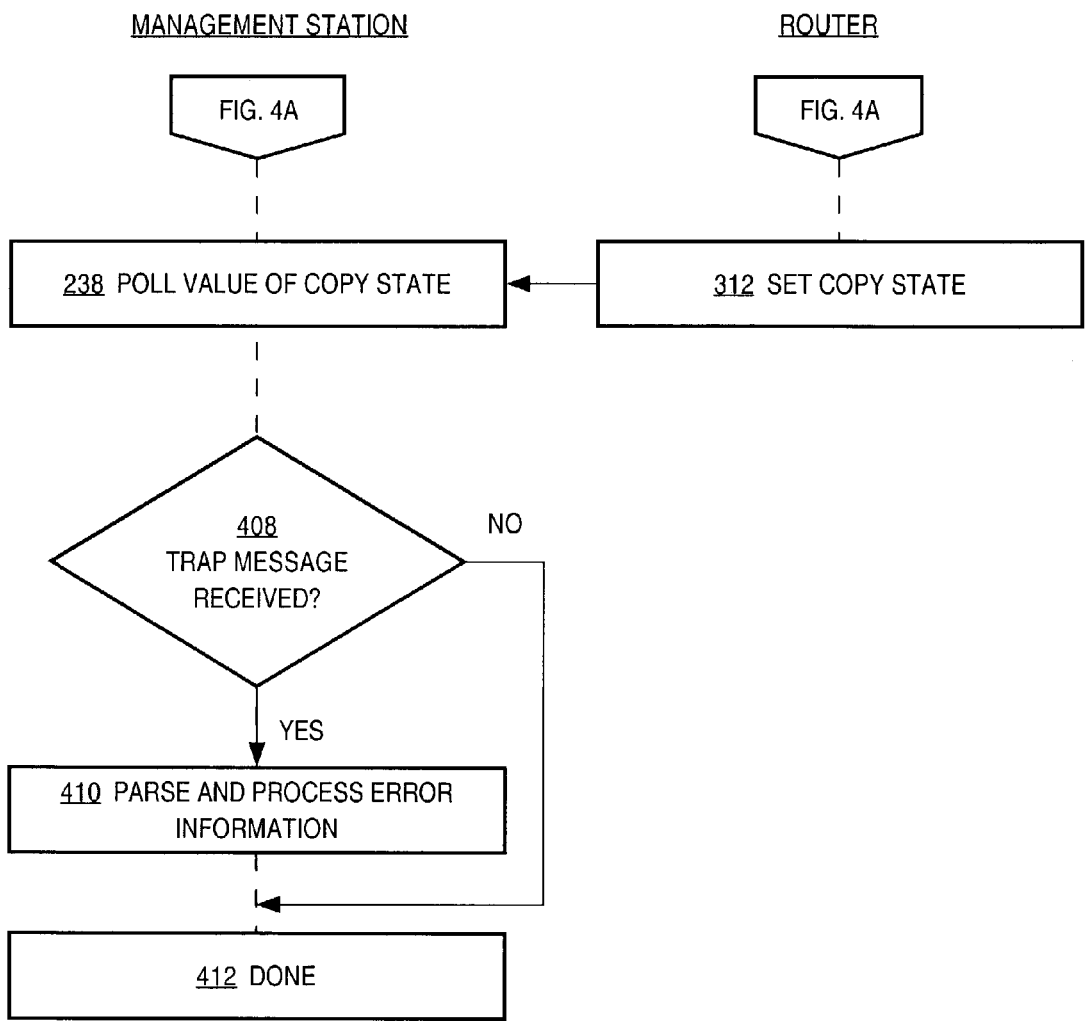

3.2 Monitoring Responses of Configuration Commands Using the Trap/Notification Approach FIG. 4A and FIG. 4B are flow diagrams that illustrate a high level overview of another embodiment of a method for monitoring responses of configuration commands using a trap/notification approach.

As in FIG. 3A, a unique index value is generated in steps 230-232 of FIG. 4A; in step 234, MIB object values are instantiated and set using the index value as an instance identifier; and in step 236, a configuration is downloaded to the router. However, unlike FIG. 3A, in step 402 of FIG. 4A, the router is configured to publish one or more trap messages that describe errors. For example, a notification type MIB extension that specifies a particular type of trap message, as depicted in Table 7, is used to configure Router 140 to publish trap messages. Further, as depicted in FIG. 4A, at step 406, the Configuration Management Application 111 subscribes to the trap messages.

At step 304, the router receives a configuration file that comprises one or more commands for configuring the router. For example, the Router 140 receives the Command File 113, which comprises one or more commands for configuring Router 140.

At step 306, the one or more commands in the configuration file are executed to configure the router. For example, the one or more commands in the Configuration File 113 are executed to configure Router 140.

At step 308, a determination is made as to whether the execution of the one or more commands results in generating a particular error. For example, a determination is made that the execution of a particular command in Configuration File 113 has generated the error. If an error occurred, then at step 404, a trap message that describes the error is published. For example, the Trapper 142 creates a trap message according to the notification type identified in Table 7, stores error information associated with the error into the trap message, and issues the trap message in a conventional manner.

Steps 306, 308, 404 may iterate for all commands in the configuration that was received at step 304. Referring to FIG. 4B, when all configuration commands are processed, as in FIG. 3B, at step 312 the value of a copy state variable is set and in step 238 the value of the copy state variable is polled to determine status of the configuration download.

In step 408, a test is performed to determine whether a trap message identifying a configuration error has been received. If so, then in step 410, the trap message is parsed and processed appropriately. For example, network management application 111 can parse the trap message, identify the error, and present the error description in an error message of the user interface of the application. In step 412, the process completes.

Figure 5A:
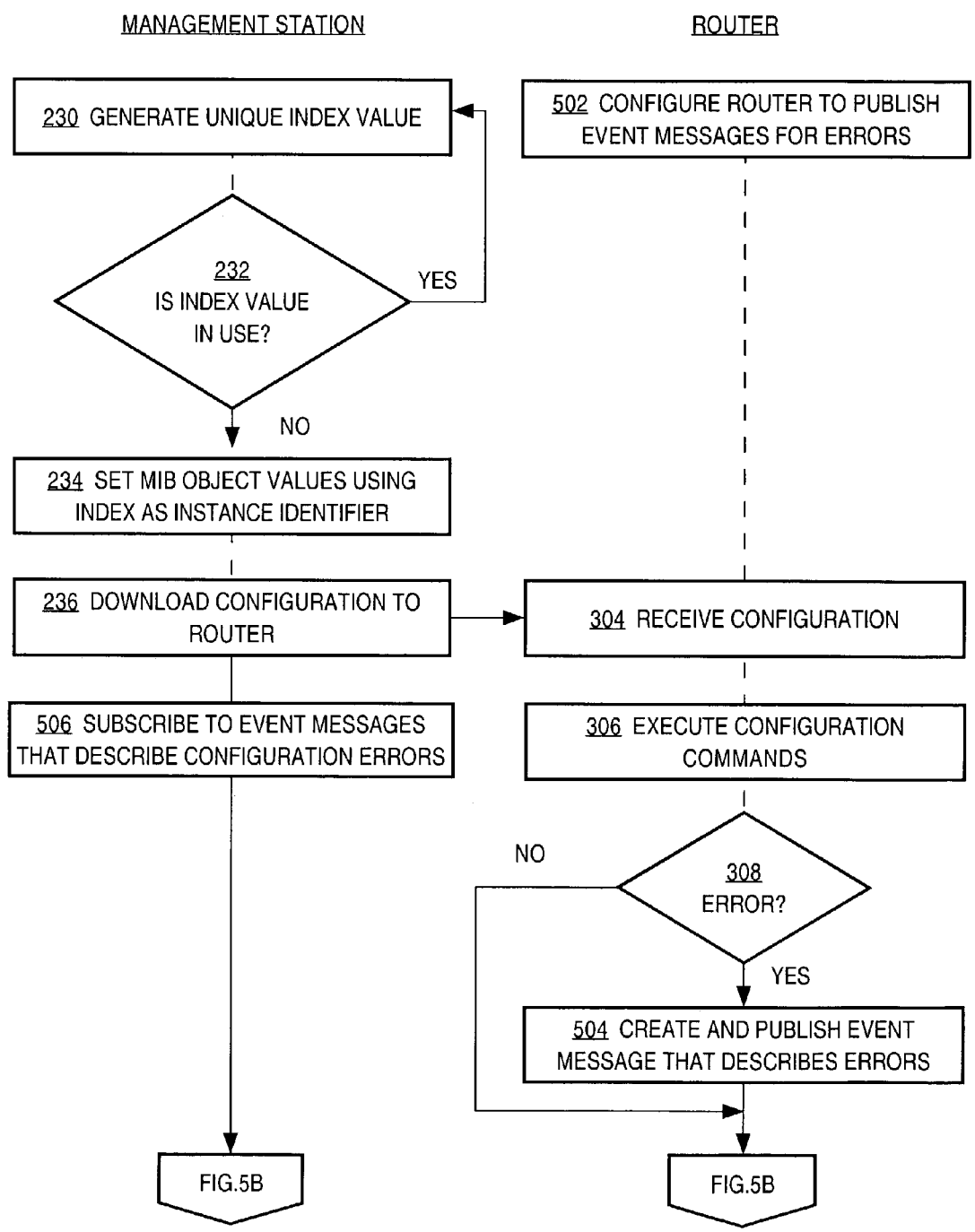
FIG. 5A and FIG. 5B are flow diagrams that illustrate a high level overview of another embodiment of a method for monitoring responses of configuration commands using a publish-subscribe approach.
Figure 5B:
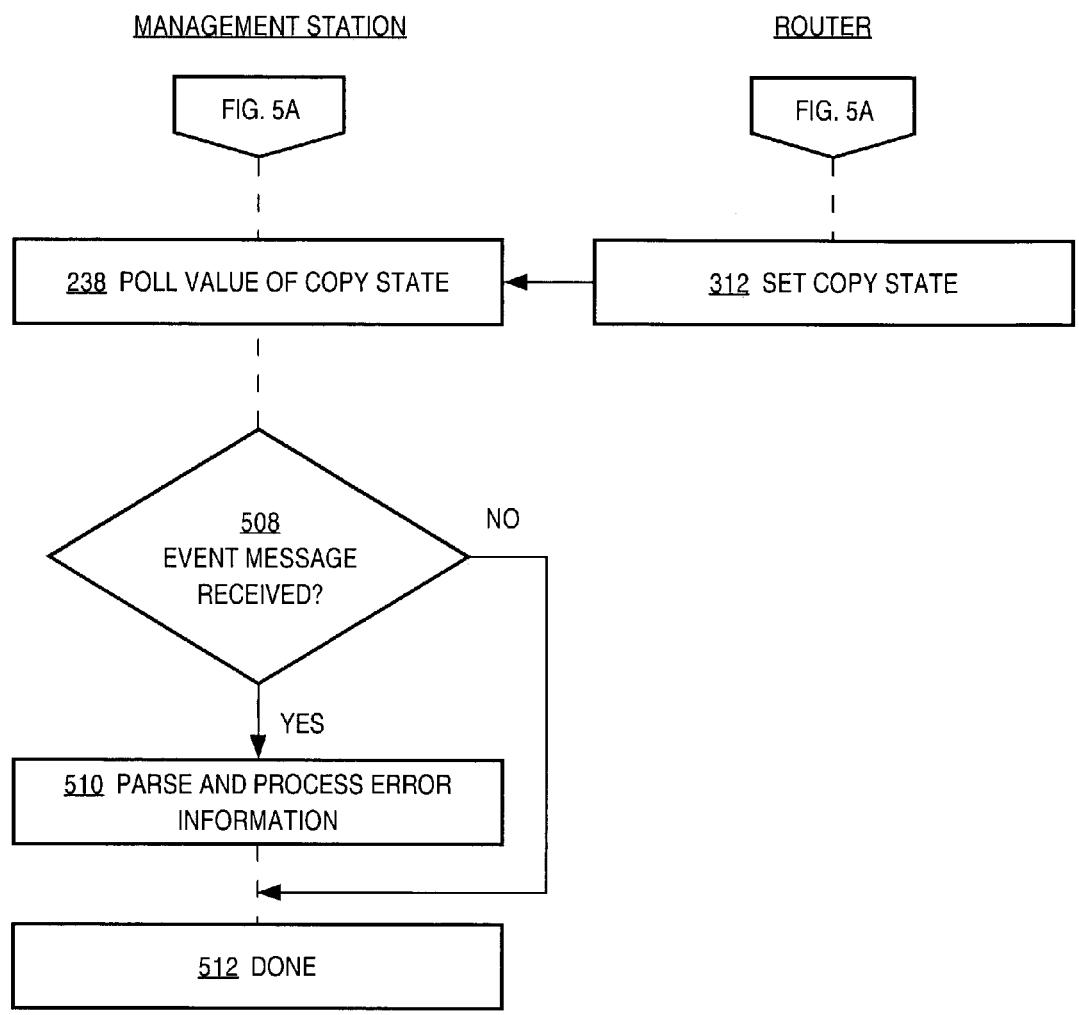

3.3 Monitoring Responses of Configuration Commands Using the Publish-Subscribe Approach FIG. 5A and FIG. 5B are flow diagrams that illustrate a high level overview of another embodiment of a method for monitoring responses of configuration commands using a publish-subscribe approach.

As in FIG. 3A, a unique index value is generated in steps 230-232 of FIG. 5A; in step 234, MIB object values are instantiated and set using the index value as an instance identifier; and in step 236, a configuration is downloaded to the router. However, unlike FIG. 3A, in step 502 of FIG. 5A, the router is configured to publish one or more event messages that describe errors. For example, the Management Protocol Agent 141 is configured to publish event messages that describe configuration errors. Further, as depicted in FIG. 5A, at step 506, the Configuration Management Application 111 subscribes to these event messages.

At step 304, the router receives a configuration file that comprises one or more commands for configuring the router. For example, the Router 130 receives the Command File 113, which comprises one or more commands for configuring Router 130.

At step 306, the one or more commands in the configuration file are executed to configure the router. For example, the one or more commands in the Configuration File 113 are executed to configure Router 130.

At step 308, a determination is made as to whether the execution of the one or more commands results in generating a particular error. For example, a determination is made that the execution of a particular command in Configuration File 113 has generated the error. If an error occurred, then at step 504, an event message that describes the error is published. For example, the Event Publishing Agent 145 creates Event Message 143, stores error information associated with the error into the Event Message 143, and publishes the Event Message 143 to subscribers, such as Configuration Management Application 111.

Steps 306, 308, 404 may iterate for all commands in the configuration that was received at step 304. Referring to FIG. 5B, when all configuration commands are processed, as in FIG. 3, at step 312 the value of a copy state variable is set and in step 238 the value of the copy state variable is polled to determine status of the configuration download.

In step 508, a test is performed to determine whether an event message identifying a configuration error has been received. If so, then in step 510, the event message is parsed and processed appropriately. For example, network management application 111 can parse the event message, identify the error, and present the error description in an error message of the user interface of the application. In step 512, the process completes.

4.0 CONCLUSION

The architecture and processes described herein provide for monitoring responses of configuration commands using a MIB based approach. A configuration management application can determine the nature of the failure while minimizing performance costs because a configuration file can be copied to a router and the error information can be provided to a configuration management application. For example, performance is improved because numerous CLI commands are no longer entered individually on the network management station; instead, file transfer mechanisms can be used to transfer an entire file of commands, and yet error information becomes available. Since error information is returned in response to either querying a command response table or as a part of a publish-subscribe mechanism or as part of a SNMP trap message, the configuration management application can take appropriate actions. Examples of appropriate action include, among other things, performing rollbacks or determining whether to copy the configuration file to other routers. The MIB extensions allow the architecture to be implemented with minimal changes to a device agent and on all device platforms. Further, the MIB extensions and the architecture can be used by all configuration management applications, such as NetConfig, ConfigArchive, ACL Manager, etc., with minimal changes.

5.0 IMPLEMENTATION MECHANISMS

Hardware Overview

Figure 6:
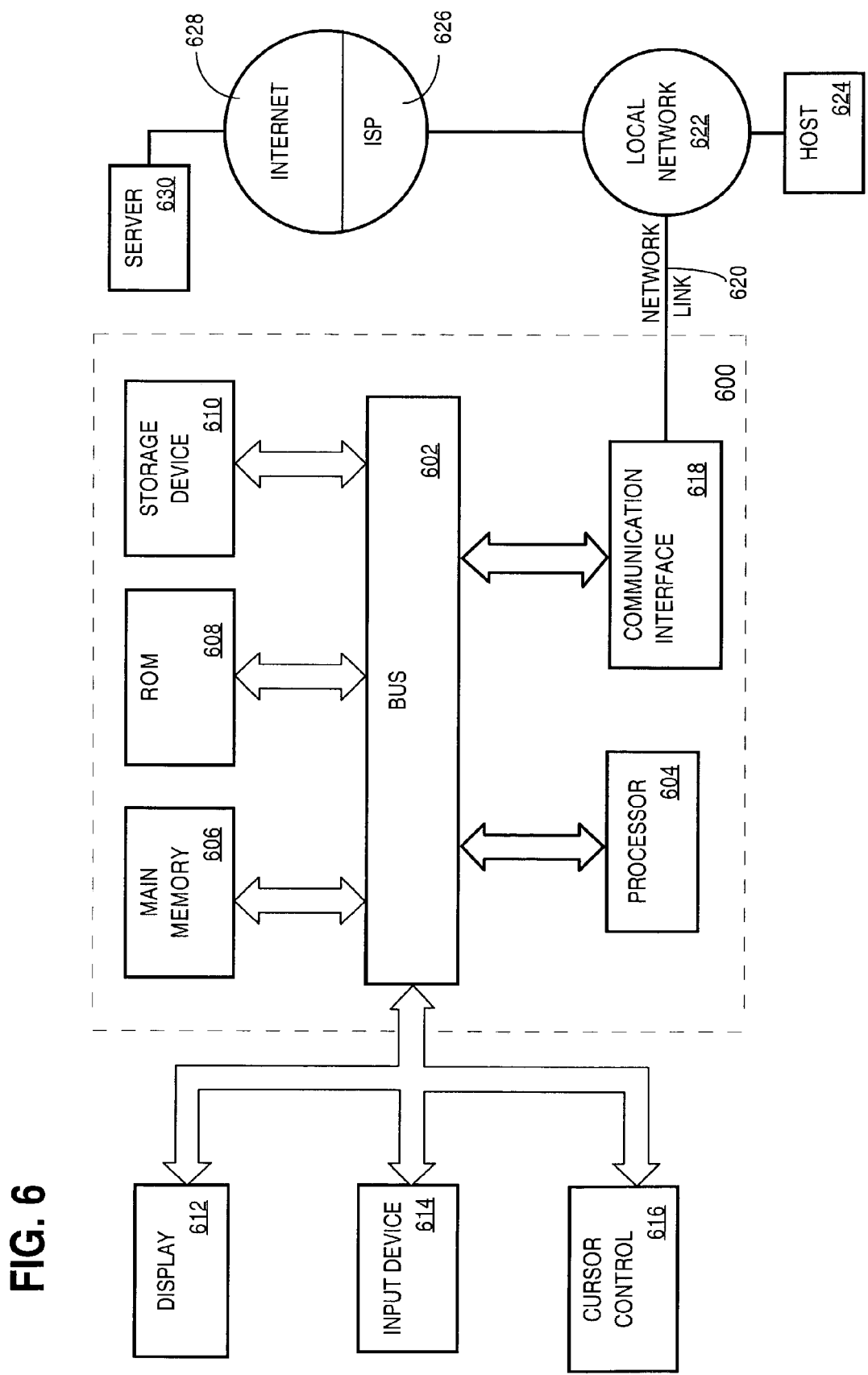
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for Monitoring responses of configuration commands using a MIB based approach. According to one embodiment of the invention, Monitoring responses of configuration commands using a MIB based approach are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for Monitoring responses of configuration commands using a MIB based approach as described herein.

The received code may be executed by processor 604 as it is received, and/or stored in storage device 610, or other non-volatile storage for later execution. In this manner, computer system 600 may obtain application code in the form of a carrier wave.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of monitoring responses of configuration commands using a MIB-based approach, the method comprising the computer-implemented steps of:

creating and storing a command response table comprising a plurality of command response entries, wherein the command response table is defined by a MIB on a network device;

wherein the command response table stores information about errors that result from executing configuration commands for configuring the network device;

receiving a configuration file that comprises one or more commands for configuring the network device;

storing configuration error information into a particular command response entry of the plurality of command response entries, wherein the configuration error information describes a particular error that occurred while executing a particular command of the one or more commands;

receiving a query for all configuration error information in the command response table that relates to a particular configuration operation;

determining all configuration error information in the command response table that relates to a particular configuration operation; and returning, in response to the query, all the configuration error information from the command response table that relates to a particular configuration operation.

2. The method as recited in claim 1, wherein the plurality of command response entries are defined by the MIB on the network device.

3. The method as recited in claim 1, wherein the configuration error information is defined by the MIB on the network device.

4. The method as recited in claim 1, wherein the configuration error information comprises a command response index that uniquely identifies the configuration file, and the step of storing the configuration error information further comprises the step of storing the command response index into the particular command response entry.

5. The method as recited in claim 1, wherein the configuration error information comprises a command line index that uniquely identifies the configuration error information in the configuration file of the particular error and the step of storing configuration error information further comprises storing the command line index into the particular command response entry.

6. The method as recited in claim 1, wherein the configuration error information comprises a command response value, wherein the command response value is one of error description information that resulted from the execution of the particular command, an error code that resulted from the execution of the particular command, and a column number in the configuration file where the particular error occurred; and wherein the step of storing configuration error information further comprises storing the command response value into the particular command response entry.

7. A method of monitoring responses of configuration commands using a MIB-based approach, the method comprising the computer-implemented steps of:

creating and storing a command response table comprising a plurality of command response entries, wherein the command response table is defined by a MIB on a network device;

receiving a configuration file that comprises one or more commands for configuring the network device;

storing configuration error information into a particular command response entry of the plurality of command response entries, wherein the configuration error information describes a particular error that occurred while executing a particular command of the one or more commands;

receiving a query for all configuration error information in the command response table that relates to a particular configuration operation;

determining all configuration error information in the command response table that relates to a particular configuration operation; and returning, in response to the query, all the configuration error information from the command response table that relates to a particular configuration operation.

8. The method as recited in claim 7, wherein:

the step of receiving the configuration file further comprises the step of creating and storing a unique identifier of the configuration file; and the step of returning the configuration error information that describes the particular error further comprises the step of returning the unique identifier of the configuration file.

9. The method as recited in claim 7, wherein the configuration error information that describes the particular error comprises an identifier of a specific location in the configuration file of the particular error.

10. The method as recited in claim 7, wherein the configuration error information that describes the particular error comprises one of error description information that resulted from an error in execution of a particular command, an error code that resulted from execution of the particular command, or a column in the configuration file where the particular error occurred.

11. A computer storage medium carrying one or more sequences of instructions for monitoring responses of configuration commands using a MIB-based approach, which instructions, when executed by one or more processors, cause the one or more processors to carry out the steps of:

creating and storing a command response table comprising a plurality of command response entries, wherein the command response table is defined by a MIB on a network device;

wherein the command response table stores information about errors that result from executing configuration commands for configuring the network device;

receiving a configuration file that comprises one or more commands for configuring the network device;

storing configuration error information into a particular command response entry of the plurality of command response entries, wherein the configuration error information describes a particular error that occurred while executing a particular command of the one or more commands;

receiving a query for all configuration error information in the command response table that relates to a particular configuration operation;

determining all configuration error information in the command response table that relates to a particular configuration operation; and returning, in response to the query, all the configuration error information from the command response table that relates to a particular configuration operation.

12. The computer storage medium as recited in claim 11, wherein the plurality of command response entries are defined by the MIB on the network device and the instructions for carrying out the step of creating and storing further comprises the instructions for the step of creating and storing the plurality of command response entries into the command response table, wherein the plurality of command response entries are defined by the MIB on the network device.

13. The computer storage medium as recited in claim 11, wherein the configuration error information is defined by the MIB on the network device, and the instructions for carrying out the step of storing configuration error information further comprises the instructions for the step of storing configuration error information that is defined by the MIB on the network device.

14. The computer storage medium as recited in claim 11, wherein the configuration error information comprises a command response index that uniquely identifies the configuration file and the instructions for carrying out the step of storing configuration error information further comprises the instructions for the step of storing the command response index into the particular command response entry.

15. The computer storage medium as recited in claim 11, wherein the configuration error information comprises a command line index that uniquely identifies the location in the configuration file of the particular error and the instructions for carrying out the step of storing configuration error information further comprises the instructions for the step of storing the command line index into the particular command response entry.

16. The computer storage medium as recited in claim 11, wherein the configuration error information comprises a command response value, and wherein the command response value is one of error description information that resulted from the execution of the particular command, an error code that resulted from the execution of the particular command, and a column number in the configuration file where the particular error occurred; and wherein the instructions for carrying out the step of storing configuration error information further comprises the instructions for the step of storing the command response value into the particular command response entry.

17. A computer storage medium carrying one or more sequences of instructions for monitoring responses of configuration commands using a MIB-based approach, which instructions, when executed by one or more processors, cause the one or more processors to carry out the steps of:
  creating and storing a command response table comprising a plurality of command response entries, wherein the command response table is defined by a MIB on a network device;
  receiving a configuration file that comprises one or more commands for configuring the network device;
  storing configuration error information into a particular command response entry of the plurality of command response entries, wherein the configuration error information describes a particular error that occurred while executing a particular command of the one or more commands;
  receiving a query for all configuration error information in the command response table that relates to a particular configuration operation;
  determining all configuration error information in the command response table that relates to a particular configuration operation; and
  returning, in response to the query, all the configuration error information from the command response table that relates to a particular configuration operation.

18. The computer storage medium as recited in claim 17, wherein:
  the instructions for carrying out the step of receiving the configuration file further comprises the instructions for the step of creating and storing a unique identifier of the configuration file; and
  the instructions for carrying out the step of returning the configuration error information that describes the particular error further comprises the instructions for the step of returning the unique identifier of the configuration file.

19. The computer storage medium as recited in claim 17, wherein the configuration error information that describes the particular error comprises an identifier of a specific location in the configuration file of the particular error.

20. The computer storage medium as recited in claim 17, wherein the configuration error information that describes the particular error comprises one of error description information that resulted from an error in execution of a particular command, an error code that resulted from the execution of the particular command, or a column number in the configuration file where the particular error occurred.

21. An apparatus for monitoring responses of configuration commands using a MIB-based approach, comprising:
  means for creating and storing a command response table comprising a plurality of command response entries, wherein the command response table is defined by a MIB on a network device;
  means for receiving a configuration file that comprises one or more commands for configuring the network device;
  means for storing configuration error information into a particular command response entry of the plurality of command response entries, wherein the configuration error information describes a particular error that occurred while executing a particular command of the one or more commands;
  means for receiving a query for all configuration error information in the command response table that relates to a particular configuration operation;
  means for determining all configuration error information in the command response table that relates to a particular configuration operation; and
  means for returning, in response to the query, all the configuration error information from the command response table that relates to a particular configuration operation.

22. An apparatus for monitoring responses of configuration commands using a MIB-based approach, comprising:
  a network interface that is coupled to the data network for receiving one or more packet flows therefrom;
  a processor;
  a storage medium carrying one or more sequences of instructions which, when executed by the processor, cause the processor to carry out the steps of:
  creating and storing a command response table comprising a plurality of command response entries,
  wherein the command response table is defined by a MIB on a network device;
  wherein the command response table stores information about errors that result from executing configuration commands for configuring the network device;
  receiving a configuration file that comprises one or more commands for configuring the network device;
  storing configuration error information into a particular command response entry of the plurality of command response entries, wherein the configuration error information describes a particular error that occurred while executing a particular command of the one or more commands;
  receiving a query for all configuration error information in the command response table that relates to a particular configuration operation;
  determining all configuration error information in the command response table that relates to a particular configuration operation; and
  returning, in response to the query, all the configuration error information from the command response table that relates to a particular configuration operation.

23. The apparatus as recited in claim 22, wherein the plurality of command response entries are defined by the MIB on the network device.

24. The apparatus as recited in claim 22, wherein the configuration error information is defined by the MIB on the network device.

25. The apparatus as recited in claim 22, wherein the configuration error information comprises a command response index that uniquely identifies the configuration file, and wherein the instructions to carry out the step of storing the configuration error information further comprise instructions to carry out the step of storing the command response index into the particular command response entry.

26. The apparatus as recited in claim 22, wherein the configuration error information comprises a command line index that uniquely identifies the configuration error information in the configuration file of the particular error and wherein the instructions to carry out the step of storing configuration error information further comprise instructions to carry out the step of storing the command line index into the particular command response entry.

27. The apparatus as recited in claim 22, wherein the configuration error information comprises a command response value, wherein the command response value is one of error description information that resulted from the execution of the particular command, an error code that resulted from the execution of the particular command, and a column number in the configuration file where the particular error occurred, and wherein the instructions to carry out the step of storing configuration error information further comprise instructions to carry out the step of storing the command response value into the particular command response entry.

28. An apparatus for monitoring responses of configuration commands using a MIB-based approach, comprising:
    a network interface that is coupled to the data network for receiving one or more packet flows therefrom;
    a processor;
    a storage medium carrying one or more sequences of instructions which, when executed by the processor, cause the processor to carry out the steps of:
    creating and storing a command response table comprising a plurality of command response entries, wherein the command response table is defined by a MIB on a network device;
    receiving a configuration file that comprises one or more commands for configuring the network device;
    storing configuration error information into a particular command response entry of the plurality of command response entries, wherein the configuration error information describes a particular error that occurred while executing a particular command of the one or more commands;
    receiving a query for all configuration error information in the command response table that relates to a particular configuration operation;
    determining all configuration error information in the command response table that relates to a particular configuration operation; and
    returning, in response to the query, all the configuration error information from the command response table that relates to a particular configuration operation.

29. The apparatus as recited in claim 28, wherein the instructions to carry out the steps of:
    receiving the configuration file further comprise instructions to carry out the step of creating and storing a unique identifier of the configuration file; and
    returning the configuration error information that describes the particular error further comprises instructions to carry out the step of returning the unique identifier of the configuration file.

30. The apparatus as recited in claim 28, wherein the configuration error information that describes the particular error comprises an identifier of a specific location in the configuration file of the particular error.

31. The apparatus as recited in claim 28, wherein the configuration error information that describes the particular error comprises one of error description information that resulted from an error in execution of a particular command, an error code that resulted from execution of the particular command, or a column in the configuration file where the particular error occurred.

* * * * *